United States Patent Office 2,869,357
Patented Jan. 20, 1959

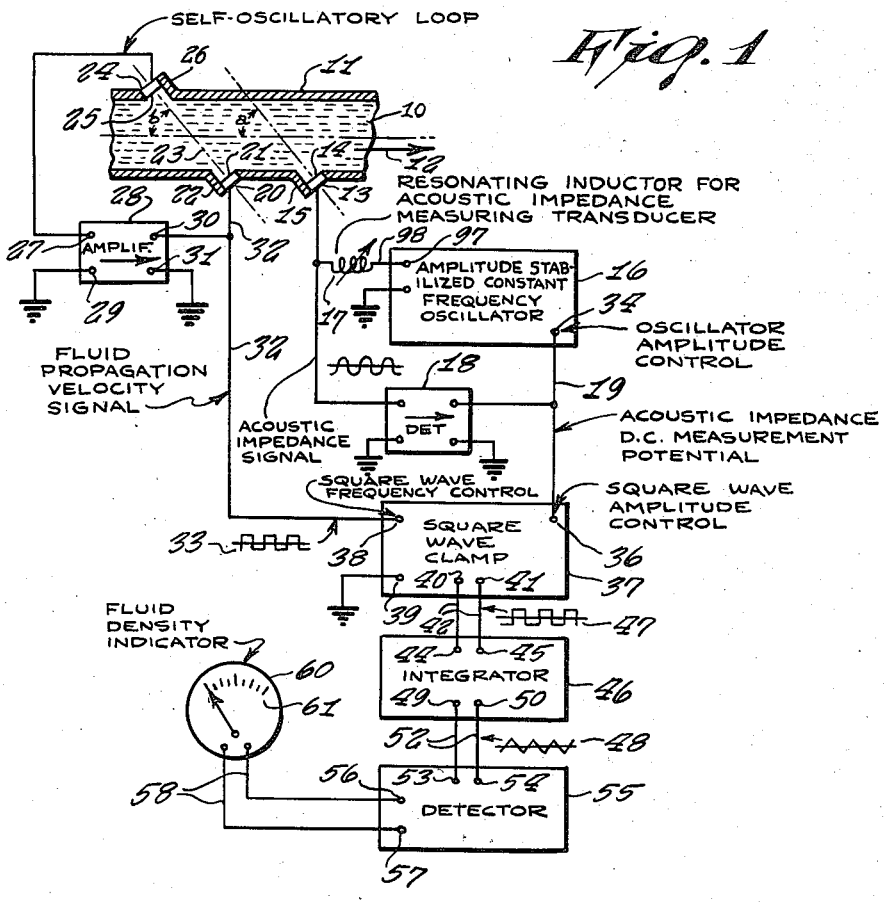

2,869,357

CONTINUOUSLY INDICATING ELECTRO-ACOUSTIC DENSITOMETER

Jack Kritz, Flushing, N. Y.

Application June 17, 1954, Serial No. 437,360

18 Claims. (Cl. 73—32)

The present invention relates to an indicating instrument for deriving a continuous measurement of the density of a fluid and more particularly the density of a fluid medium flowing continuously through a duct past a predetermined point where the fluid density is continuously measured.

Generally, the invention comprises two basic portions, one being a device which continuously measures the acoustic impedance of the fluid, and the other being a velocity measuring device which generates a signal whose frequency and period are determined by the propagation velocity of acoustic waves through the fluid medium flowing in the duct. These two devices each comprise electroacoustic transducting means in continuous physical contact with the fluid of which the density is being measured and continuously indicated. The measurements derived by these two devices are combined to obtain an indication of the fluid density.

The invention further comprises means for the correction of certain errors in measurement which would otherwise be introduced in the final results by inherent characteristics of component apparatus which forms a part of the densitometer.

The acoustic impedance of any fluid may be expressed as the function $\rho v$, where $\rho$ is the density of the fluid and $v$ is the propagation velocity of acoustic waves in the fluid. An electroacoustic transducer is provided which is in physical contact with the fluid medium. The electrical impedance of the transducer is resonated to eliminate the reactive component, which, in the case of a piezo-electric crystal, is capacitative at a resonant frequency of the crystal. The capacitance is caused principally by the electrostatic capacitance between the spaced parallel active faces of the crystal. The non-reactive component R of the crystal impedance is generally proportional to the reciprocal of the acoustic impedance of the fluid to which the crystal is coupled, being related thereto by a constant of proportionality K, such that $R=K/\rho v$. In the embodiment of the invention illustrated, a resonated crystal transducer is utilized, an adjustable inductor being provided to tune the crystal precisely to resonance. Under these conditions, the voltage drop across the crystal is a linear function of the acoustic impedance of the fluid.

Simultaneously with the measurement of the acoustic impedance, a velocity signal is generated which has a frequency directly proportional to the velocity of propagation of acoustic waves in the fluid medium. This signal is obtained by means of a self-oscillatory feedback loop which extends through a portion of the fluid medium. The time constants of the feedback loop are such that its frequency of oscillation is determined effectively entirely by the propagation velocity of acoustic waves traveling through the fluid medium.

These two signals are combined in a clamp stage which produces a square wave output, the amplitude of the square wave being a linear function of the acoustic impedance and the duration or period of each wave being inversely proportional to the propagation velocity. This square wave includes an information component which is independent of the propagation velocity and which is directly proportional to the fluid density alone. By means of suitable integrating and detecting networks, this information component of the square wave is converted into a smooth unidirectional measurement potential which is proportional at every instant to the actual density of the fluid medium.

Various objects, features and advantages of the invention will become apparent upon reading the following specification together with the accompanying drawing forming a part hereof.

Referring to the drawing:

Figure 1 is a diagrammatic representation of an embodiment of the invention.

Figure 2 is a simplified fragmentary schematic circuit diagram showing an acoustic impedance measuring circuit illustrating means for compensating for certain inherent errors of measurement.

Figure 3 shows a wave shape which is subsequently integrated and rectified to determine the desired density.

Figure 4:
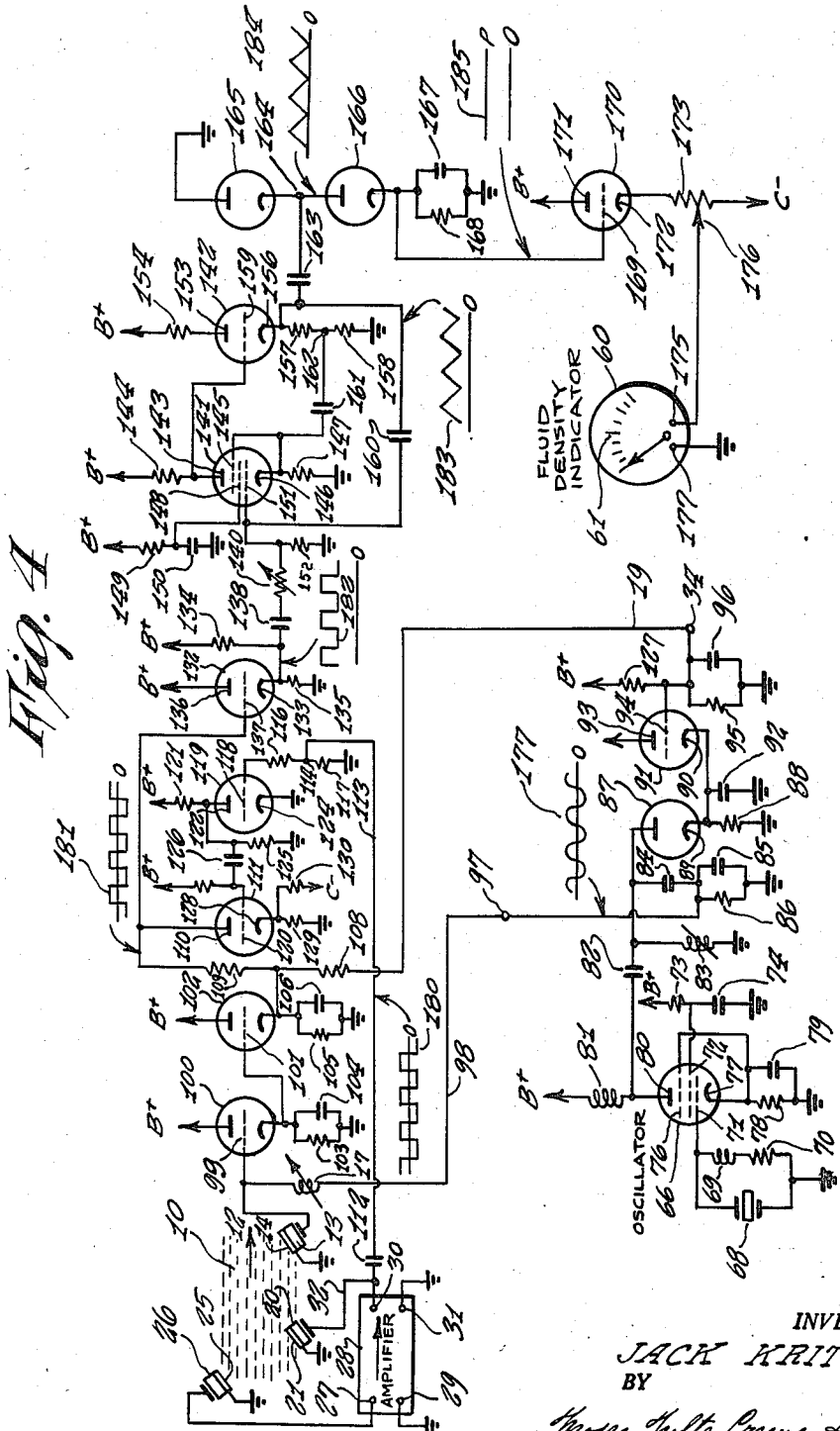
Figure 4 is a schematic circuit diagram showing in greater detail the embodiment of the invention illustrated diagrammatically in Fig. 1.

Referring to Fig. 1 the liquid 10 of which the density is to be continuously measured is confined within a pipe or duct 11 and flows to the right in the direction indicated by the arrow 12. An electroacoustic crystal transducer 13 is mounted in the lower wall portion of the duct 11 and has an active crystal surface 14 in physical contact with the fluid 10. The transducer 13 is being shown positioned out of the fluid stream in a lateral extension 15 of the duct 11.

The crystal transducer 13 is energized from an amplitude stabilized constant frequency oscillator 16 through an adjustable series connected resonating inductor 17. It is assumed that the active face 14 of the crystal 13 which is in contact with the fluid 10 is effectively connected to ground by the electrical conductivity of the fluid 10, or if the fluid 10 is not sufficiently electrically conductive, then the active face of the crystal may be treated in conventional and well known manner with a thin coating of finely divided metallic particles such as gold, aluminum or other suitable material, the metallic coating being grounded in any desired manner.

While the crystal 13 is illustratively shown in direct and intimate contact with the fluid 10, it is to be understood that the crystal 13 may be acoustically coupled to the fluid 10 by suitable coupling means. Such coupling means may comprise a coupling plate interposed between the crystal and the fluid. The plate is preferably formed of material which has low acoustic attenuation characteristics. The thickness of the plate should be equal to an integral number of half waves at the operating frequency of the crystal, when considering the propagation velocity of acoustic waves through the material of which the plate is formed.

The inductor 17 is precisely adjusted to resonate the capacitative component of the electrical impedance of the crystal 13. As a result, the voltage drop across crystal 13 is determined principally by the acoustic impedance of the fluid 10 and also includes a constant impedance whch results from energy losses in the crystal itself, the crystal holder and other similar constant factors.

This potential is a linear function of the acoustic impedance of the fluid 10. The linear function may be expressed in the general slope-intercept form: $y=mx+b$. The potential across the crystal 13 is rectified by a linear detector 18 and appears as a unidirectional measurement potential on a conductor 19, the measurement potential being considered with reference to ground.

Simultaneously with the production of the acoustic impedance measurement potential, there is generated a propagation velocity signal. A transmitting transducer 20 having an active face 21 in physical contact with the fluid 10 is disposed in a lateral extension 22 of the duct 11. The transmitting transducer 20 is preferably highly directional in its radiation characteristics and the acoustic waves propagated by the transmitting transducer 20 are directed along the rectilinear transmission path indicated by the line 23 to a receiving transducer 24.

The receiving transducer 24 has an active face 25 in physical contact with the fluid 10 and is disposed in a lateral extension 26 of the duct 11, out of the path of fluid flow of the fluid 10. The receiving transducer 24 converts the acoustic waves which are propagated by the transmitting transducer 20 and which impinge against its active face 25 into a corresponding electrical voltage wave. This electrical voltage wave is applied to the ungrounded input terminal 27 of an amplifier 28. The other input terminal 29 of amplifier 28 is shown grounded. The amplifier 28 is provided with two output terminals 30 and 31. Output terminal 30 is connected via a conductor 32 back to the transmitting transducer 20. The other output terminal 31 of amplifier 28 is shown grounded. These connections produce a self-oscillatory loop extending through amplifier 28 which has sufficient gain to produce sustained self-oscillation. The self-oscillatory loop extends via conductor 32 to the transmitting transducer 20 which reconverts the electrical voltage waves from the output of amplifier 28 into acoustic waves. The acoustic waves propagated by transmitting transducer 20 travel along line 23 to receiving transducer 24 where they are reconverted to electrical voltage waves. These waves are applied to the input of amplifier 28 for amplification and repropagation by transmitting transducer 20. The wave shape of these electrical voltage waves is inherently rectangular as indicated by the waveform diagram 33 which applies to conductor 32.

The paths of travel of the acoustic waves propagated by impedance measuring transducer 13 and transmitting transducer 20 make equal angles $a$ and $b$, respectively, with the direction of flow of the fluid medium 10 as indicated by the arrow 12. It can be shown mathematically that if angles $a$ and $b$ are equal, no errors in measurement are introduced by any flow velocity of the fluid.

The acoustic impedance measurement potential which appears on conductor 19 is applied to an amplitude control terminal 34 of oscillator 16. The regenerative feedback circuit which is thus obtained serves to eliminate certain inherent errors in measurement which are described in greater detail below. The acoustic impedance measurement potential on conductor 19 is also applied to an amplitude control terminal 36 of a square wave clamp circuit 37.

The square wave clamp circuit 37 is also provided with a frequency control terminal 38 and with a grounded input terminal 39. The output of amplifier 28 is applied to frequency and time base control terminal 38 of clamp circuit 37 via conductor 32. As described in greater detail below, the output of square wave clamp circuit 37 is a square wave having an amplitude which is a linear function of the acoustic impedance of the fluid 10 plus an added constant and a time base or period which is inversely proportional to the frequency of propagation of acoustic waves in the fluid medium 10.

The output of square wave clamp circuit 37 appears at output terminals 40 and 41 which are connected by a pair of conductors 42 to the input terminals 44 and 45 of an integrator 46.

The input to integrator 46 is a square wave as indicated by waveform diagram 47 which applies to the pair of conductors 42. The negative-going portion of the waves in waveform diagram 47 is subsequently suppressed and the positive going portion is measured only above a fixed threshold to eliminate a constant error factor as more fully described below.

The integrator 46 converts the square wave as indicated by waveform 47 to a triangular wave as indicated by waveform diagram 48. This triangular wave appears at the output terminals 49 and 50 of integrator 46. The peak amplitude of the triangular wave is proportional to the density of the fluid which is to be measured. The output terminals 49 and 50 of integrator 46 are connected by pair of conductors 52 to the input terminals 53 and 54 of a peak voltage detector 55.

A smooth unidirectional potential proportional to the density of the fluid 10 appears at the output terminals 56 and 57 of detector 55 and this potential is applied via a pair of conductors 58 to a density indicator 60. The indicator 60 is a direct current measuring instrument provided with a calibrated scale 61 preferably graduated according to some desired system of density measurement units.

Referring to Fig. 2, there is shown an arrangement for correcting measurement errors introduced by energy losses within the density measuring apparatus, such errors being inherent in any actual physical apparatus embodying the present invention.

The acoustic impedance of the fluid medium 10 is directly proportional to the expression $\rho v$ where $\rho$ is the density of the fluid medium 10 and $v$ is the propagation velocity of acoustic waves in the medium 10. The crystal transducer 13 serves as an impedance transforming device which transforms the acoustic impedance of the fluid medium 10 into an electrical impedance such that the non-reactive component of the electrical impedance is an inverse linear function of the acoustic impedance of the fluid medium. The static capacitance of the crystal transducer 13 may be represented by a capacitor 62 (Fig. 2) of which the capacitance is $C_{62}$. The non-reactive component of the impedance of crystal transducer 13 may be represented by a resistor 63 the resistance of which is $R_{63}$. The inductance of resonating inductor 17 is $L_{17}$. Because $L_{17}$ resonates $C_{62}$ at the frequency of oscillator 16, the overall reactance of the series circuit is effectively zero and the controlling current limiting factor in the series resonant circuit 17—62—63 is the value of $R_{63}$ which is determined principally by the reciprocal of the value of the acoustic impedance $\rho v$ of the fluid medium 10. Thus, the greater the value of the acoustic impedance $\rho v$, the greater will be the value of current flow I through the series resonant circuit 17—62—63. The value of the current I which flows through the series circuit 17—62—63 may be expressed as $$I = E/(K/\rho v) = E\rho v/K$$

The value of $R_{63}$ is small as compared to the value of $X_{62}$ where $X_{62}$ is the reactance of the capacitive component of the impedance of crystal transducer 13. The voltage drop across the transducer 13 is therefore relatively substantially proportional to the acoustic impedance $\rho v$ throughout a reasonable range of variation in the value of $\rho v$.

This proportionality would be correctly maintained, except for inherent energy losses in the resonating inductor 17 which, as a practical matter, cannot have a "Q" of infinity. The expression for "Q" is $\omega L/R$ where R is a theoretical resistance value representative of the actual energy losses inherent in any resonant circuit, $\omega$ is the frequency in radians per second, and L is the inductance value of the inductor.

In order to compensate for the actual finite value of "Q" an adjustable portion of the output voltage of detector 18 is picked off by means of a potentiometer 64 and utilized to control the output of oscillator 16. The potentiometer 64 has been omitted from Fig. 1 for simplicity of illustration. The portion of the output voltage of detector 18 which is picked off by potentiometer 64 is applied via the conductor 19 to the amplitude control terminal 34 of oscillator 16 and is so selected that it adds a component to the otherwise constant output voltage of generator 16 such that the added component is equal to the magnitude of the output voltage of detector 18 divided by Q. In this manner, the output voltage of detector 18 is so compensated that it is directly proportional to value of the acoustic impedance $\rho v$, notwithstanding the fact that the actual value of "Q" is less than the ideal value of infinity, the compensation being effected by a regenerative feedback circuit 64—19—34.

Although the feedback arrangement illustrated in the drawing shows an oscillator output which is assumed to increase with increasing potential drop across the acoustic impedance measuring crystal 13, the correction voltage which is applied to the oscillator terminal 34 may be negative in certain instances and thus cause a decrease instead of an increase in oscillator output. The losses in the tuning inductor 17 insert an undesired resistance in the circuit. With fluids of low acoustic impedance, the reflected electrical resistance is increased, but the current in the series circuit 17—62—63 does not decrease commensurately because of the resistance of inductor 17. A negative correction voltage must therefore be applied to the oscillator output control terminal 34. With a fluid of high acoustic impedance, however, the reverse situation is true. The reflected electrical resistance is low, but a corresponding increase in current flow through crystal 13 is prevented by the resistance of inductor 17. A positive correction voltage is therefore required which will increase the amount of current flow through impedance measuring crystal 13 by an amount sufficient to compensate for the resistance of the resonating inductor 17. In practice, the circuit constants are preferably so selected that for the middle of the fluid density range, no "Q" correction potential is required, thus minimizing the amount of correction involved for any particular value of fluid density.

The compensated output of detector 18 is applied together with the propagation velocity signal produced by the self-oscillatory loop 24—28—20 to the square wave clamp circuit 37 (Fig. 1) to produce an output signal from which is subtracted a small constant voltage which represents the effect of loading of the crystal caused by its mounting and any other factors of a similar character. The alternating current delivered to the integrator is of rectangular waveform as shown in Fig. 3. The amplitude square wave is shown as $K_1 \rho v$ and its half-period or time base is shown as $K_2/v$, the on and off half-periods being substantially equal.

The integrator 46 and detector 55 which are shown in Fig. 1, cooperate to convert the signal having the rectangular waveform illustrated in Fig. 3 into a unidirectional measurement potential which is directly proportional to the density of the fluid 10. The integrator 46 continuously evaluates the area beneath successive rectangular half-waves of Fig. 3 from a peak intensity standpoint and the detector 55 converts this peak signal, which is of triangular waveform, into a smooth measurement potential from which the time base $1/v$ has cancelled itself out. This analog measurement potential, which is applied to a suitably calibrated measuring instrument, provides a direct indication of the fluid density.

Referring to Fig. 4, the circuit previously described in a general manner in connection with Fig. 1 is shown in greater detail. The duct 11 has been omitted for simplicity of illustration.

A pentode 66 is shown connected as a conventional oscillator of which the frequency is maintained substantially constant by a crystal 68 in the usual manner. The constant frequency of the oscillator frequency control crystal 68 is selected to be one of the resonance frequencies of the acoustic impedance measuring crystal 13. An inductor 69 and a resistor 70 are customary circuit elements associated with the oscillatory pentode 66 and are connected to its control grid 71. The screen grid 72 of oscillator pentode 66 is suitably biased from a source of anode potential B+ through a dropping resistor 73 connected to a grounded by-pass capacitor 74. The suppressor grid 76 is connected to the cathode 77 in the usual manner. The cathode 77 is returned to ground through a biasing resistor 78 shunted by a by-pass capacitor 79.

The anode 80 of oscillator pentode 66 is energized from the source of anode potential B+ through a coupling inductor 81 and is connected through a coupling capacitor 82 to a parallel resonant tank circuit comprising an adjustable inductor 83 and series connected capacitors 84 and 85. The tank circuit 83—84—85 is resonant at the frequency of crystal 68.

The grounded capacitor 85 is shunted by a resistor 86. A diode 87 is connected in shunt across the tank circuit 83—84—85 and serves to limit the peak voltage amplitude developed across the parallel resonant tank circuit.

The potential at which oscillator output voltage stabilizing diode 87 begins to clip the voltage peaks and limit the maximum voltage across tank circuit 83—84—85 is determined by the potential drop across a resistor 88 included in the ground return circuit of the cathode 89 of diode 87 and also included in the ground return circuit of the cathode 90 of a control triode 91. The resistor 88 is shunted by a by-pass capacitor 92.

The oscillator output control triode 91 is connected as a cathode follower, resistor 88 being a common cathode resistor which provides direct cathode coupling between triode 91 and diode 87. The anode 93 of output control triode 91 is directly connected to the source of anode potential B+. The control grid 94 of control triode 91 is connected to an oscillator output control conductor 19 which is in turn connected to the oscillator output control terminal 34. A resistor 95 shunted by a by-pass capacitor 96 is connected from grid 94 of output control triode 91 to ground which together with resistor 127 connected from grid 91 to B+ form a voltage divider. This voltage divider fixes a stable normal level for the voltage on the grid 94 of triode 91 and therefore fixes a normal output level for the oscillator. As control terminal 34 is caused to become increasingly positive, as described below, grid 94 which is connected thereto, also becomes more positive. This, in turn, increases the current flow through triode 91 and cathode resistor 88, and correspondingly increases the magnitude of the peak potential across tank circuit 83—84—85 which is required to produce conduction through diode 87. Thus, the greater the positive potential between oscillator output control terminal 34 and ground, the greater will be the stabilized magnitude of the oscillator output.

The series connected capacitors 84 and 85, in addition to tuning the tank circuit inductor 83, also act as a voltage divider. The reduced voltage appearing across capacitor 85 is connected to oscillator output terminal 97 and thence via a conductor 98 to the adjustable resonating inductor 17 which resonates the acoustic impedance measuring crystal 13.

The potential drop across acoustic impedance measuring crystal 13 is applied to the control grid 99 of a detector triode 100 which is connected as a detector of infinite input impedance. The output of detector triode 100 is coupled by direct connection to the control grid 101 of a cathode follower triode 102. Detector triode 100 is provided with a cathode resistor 103 shunted by a capacitor 104. Cathode follower triode 102 is similarly provided with a cathode resistor 105 shunted by a capacitor 106. The circuit constants are so selected that the triodes 100 and 102, acting as an infinite impedance detector and cathode follower, produce a direct current output potential across cathode resistor 105 of triode 102 which is proportional to the peak voltage across acoustic impedance measuring crystal 13.

The unidirectional acoustic impedance measurement potential across output resistor 105 of triode 102 is applied through a resistor 108 and conductor 19 to the output control terminal 34 of oscillator 16 comprising the crystal controlled oscillator pentode 66. This is a regenerative feedback connection which compensates for the energy losses in the resonating inductor 17 and other portions of the circuit of acoustic impedance measuring crystal 13 as described above. The potential developed across cathode resistor 105 is therefore a "Q" corrected measurement potential which is generally proportional to the acoustic impedance $\rho v$ of the fluid medium 10.

The unidirectional acoustic impedance measurement potential across cathode resistor 105 of triode 102 is also applied through a resistor 109 to the anode 110 of a clamp tube shown as a triode 111.

The square wave output of self-oscillatory velocity measurement amplifier 28 is applied through a coupling capacitor 112 and a conductor 113 to the junction 114 between series connected resistors 116 and 117. The control grid 118 of an amplifier triode 119 is returned to ground through the serially connected resistors 116 and 117 and the propagation velocity measurement wave from amplifier 28 is applied to the junction 114 between resistors 116 and 117 and provides an input wave of rectangular waveform which is symmetrical with respect to ground. The output of amplifier triode 119 is applied to the control grid 120 of clamp tube 111 and determines both the repetition rate and duration of successive periods of conductivity through clamp tube 111. Anode potential from the source B+ is applied through a coupling resistor 121 to the anode 122 of amplifier tube 119, the cathode 124 of amplifier tube 119 being grounded. A resistor 125 connected from anode 122 to ground reduces the anode potential by causing a fixed minimum current flow through coupling resistor 121. The anode 122 of amplifier tube 119 is connected through a coupling capacitor 126 to the control grid 120 of clamp tube 111.

Appearing at the oscillator output control terminal 34 is a constant positive potential produced by the serially connected voltage dividing resistors 127 and 95, resistor 95 being connected from the grid 94 of oscillator control triode 91 to ground, as described above, and the resistor 127 being connected from the source of anode potential B+ to the ungrounded side of resistor 95. This produces a fixed positive reference potential determining the magnitude of the constant frequency output voltage which appears at oscillator output terminal 97, except to the extent that this fixed reference potential is modified by the acoustic impedance measurement potential applied to oscillator output control terminal 34 from the cathode follower detector tube 102 to provide the regenerative feedback corrective action described above to compensate for the finite value of the "Q" of the resonating inductor 17.

The cathode 128 of clamp tube 111 is connected to ground through a resistor 129 and is also connected to a source of negative potential indicated as C— through a resistor 130, the cathode 128 thus being normally maintained at a negative potential with respect to ground. The control grid 120 receives a symmetrical velocity wave from amplifier tube 119 through coupling capacitor 126. As a result, the control grid 120 of clamp tube 111 is alternately driven first in a positive direction and then in a negative direction by successive half cycles of the rectangular velocity wave. During each positive going half wave, clamp tube 111 becomes effectively completely conductive and connects its anode 110 to the negative potential maintained on its cathode 128 by source C— through resistor 130. During the succeeding negative going half wave, the clamp tube 111 is biased to cut-off and the acoustic impedance measurement potential derived from cathode follower detector triode 102 through resistor 109 appears at the anode 110 of clamp tube 111. The resulting output wave from clamp tube 111 is a wave of rectangular waveform with positive going portions having an amplitude generally proportional to the acoustic impedance of the fluid medium 10 and negative going portions having an immaterial arbitrary amplitude determined by the negative potential on the cathode 128 of clamp tube 111.

The repetition rate of these positive going portions is directly proportional to the velocity of propagation $v$ of acoustic waves in the fluid medium 10, and the time base or duration of each positive going portion is therefore directly proportional to the reciprocal of the velocity $v$ or $1/v$. Accordingly, the area under each rectangular positive going portion of the clamp tube output wave is proportional to the product of its base and its altitude or $(\rho v)(1/v)$. This area is directly proportional to the desired density $\rho$.

Before determining the density by integration, a constant error factor is first removed from the positive going portions of the output wave from clamp tube 111 and the negative going portions of the wave are effectively suppressed. This constant error factor is caused by such items as the constant acoustic impedance of the crystal holder which is partially measured by the crystal 13 and other undesired acoustic impedances of a constant nature which may be similarly included as components of measured total impedance of crystal 13.

This constant error factor is removed by a corrector triode 132 having a cathode 133 which is maintained at an accurately fixed and predetermined normal positive potential by serially connected voltage divider resistors 134 and 135 connected from the anode supply B+ to ground. Corrector triode 132 is connected as a cathode follower having its anode 136 connected directly to the anode supply B+ and the voltage divider resistor 135 serving as an output resistor. The rectangular wave output from clamp tube 111 is applied to the control grid 137 of corrector triode 132.

The negative going portions of the output wave from clamp tube 111 have no effect on the output of corrector triode 132, and are thus suppressed. The positive going portions will have no effect until each half wave swings grid 137 above the fixed normal positive potential on cathode 133 of triode 132, or at least reduces the grid bias on grid 137 to a point where triode 132 commences to operate as a linear cathode follower stage. This voltage is so selected with respect to the constant error factor that a fixed constant initial portion of each positive going half wave is rendered ineffective and hence deducted from the output wave from triode 132. The corrected output potential which appears across output resistor 135 thus rises successively in a positive direction, the amount of each rise being proportional to the corrected value of the acoustic impedance of the fluid 10 from which the constant error factor included in the impedance of the crystal 13 has been eliminated.

The rectangular wave across output resistor 135 is rendered symmetrical about the zero voltage axis by a coupling capacitor 138 and applied to an adjustable slope control resistor 140 which forms a part of a conventional integrating circuit of the so-called "Miller" type comprising a pentode 141 and a triode 142.

The Miller integrator 141—142 performs in the same manner as an equivalent series circuit comprising a resistor of high resistance and a large theoretical capacitor. The theoretical capacitor is sufficiently large to render its charging and discharging curves effectively linear, the inherent exponential curvature being sufficiently small to be negligible. The corrected symmetrical rectangular wave from coupling capacitor 138 is applied to charge the theoretical capacitor through the slope control resistor 140 during its positive going portions and to recharge the theoretical capacitor in the opposite direction during its negative going portions. The peak voltage to which the theoretical capacitor will become charged is proportional to the product of the amplitude of the square wave and its duration. The result is a wave of triangular waveform having a peak amplitude proportional to the area under each individual positive going half wave and hence proportional to the desired density.

An actual capacitor of suitable capacitance would produce an integrated triangular wave of extremely low amplitude and would be generally unsatisfactory in practice. Accordingly, the Miller integrator is used. This utilizes an amplified plate to grid capacitance effect derived from the pentode 141 and feedback capacitor 160 instead of an actual capacitor in the form of a separate circuit element. The amplification greatly increases the apparent capacitance and provides an amplified triangular wave having an amplitude which is independent of the usual instability in gain characteristics usually found in commercial pentodes.

The pentode 141 of the Miller integrator comprises an anode 143 connected to the source of anode potential B+ through a coupling resistor 144. The suppressor grid 145 is connected to the cathode 146 in the usual manner, cathode 146 being connected to ground through a resistor 147. The screen grid 148 is connected to the anode supply B+ through a dropping resistor 149. A by-pass capacitor 150 is connected from screen grid 148 to ground. The control grid 151 is connected to the right hand end of slope control resistor 140. Control grid 151 is normally maintained at ground potential by resistor 152, bias being provided by the cathode resistor 147.

The anode 153 of triode 142 is connected to the anode supply B+ through a resistor 154. The cathode 156 of triode 142 is returned to ground through serially connected resistors 157 and 158. The grid 159 of triode 142 is connected directly to the anode 143 of pentode 141. Triode 142 is connected as a cathode follower and its output is connected back to the control grid 151 of pentode 141 through an integrating capacitor 160 to oppose any rapid change in potential at control grid 151 and thus simulate the action of a large capacitor. A positive or regenerative feed-back path comprising a coupling capacitor 161 extends from the junction 162 between serially connected cathode resistors 157 and 158 of triode 142 to the cathode 146 of pentode 141. This regenerative feed-back path increases the loop gain through pentode 141 and stabilizes the operation of the integrator circuit. The triode 142 is connected as a directly coupled cathode follower stage and serves to provide a low impedance circuit for driving the integrating capacitor 160 from one peak charge to the next peak charge of opposite polarity without a substantial loss in loop gain.

When a positive going half wave is applied to control grid 151 of pentode 141, the pentode becomes more conductive and the accompanying increased voltage drop in anode resistor 144 causes anode 143 to change potential in a negative direction. This negative going change is applied to the grid 159 of triode 142 thereby decreasing its conductivity and causing cathode 156 to change potential in a negative going direction. The change is applied through the integrating capacitor 160 to the control grid 151 of pentode 141 where it opposes the positive going potential applied to control grid 151 through slope control resistor 140. The potential at control grid 151 is thereby retarded in rising to the peak value of the positive going half of the rectangular wave and is permitted to rise only to the extent that integrating capacitor 160 becomes charged and builds up an increasing potential which opposes the negative going change in potential of the cathode 156 of triode 142. Since the effect of this charging potential is applied to the control grid 151 of the pentode 141, it is multiplied by the gain of pentode 141 when it appears at the anode 143 of pentode 141. The cathode follower triode transfers this amplified change in potential to its cathode 156 without unduly loading the relatively high impedance anode circuit of pentode 141.

For the negative going half waves of rectangular shape, the action is the direction opposite to that described above, with cathode 156 of triode 142 changing potential in a positive going direction to oppose the negative potential at control grid 151 of pentode 141, such opposition decreasing as the integrating capacitor 160 becomes charged.

The regenerative feedback circuit through coupling capacitor 161, in the case of a positive going half wave applied to the control grid 151 of pentode 141, applies to cathode 146 of pentode 141 a portion of the accompanying negative going potential which appears at cathode 156 of cathode follower triode 142. Without the regenerative feedback path, the cathode 146 of pentode 141 would tend to change potential in the positive direction along with its associated control grid 151 because of increased conduction through pentode 141 and because there is no by-pass capacitor around cathode resistor 147 to offset the degenerative action of cathode resistor 147. However, a negative going potential derived from the low impedance source constituted by the junction 162 between serially connected cathode resistors 157 and 158 of cathode follower triode 142 is applied to the cathode 146 of pentode 141. This potential from a low impedance source drives cathode 146 in a negative direction, thereby counteracting the degenerative effect of the unbypassed cathode resistor 147, and thus acting as a regenerative feedback loop which increases the effective potential between control grid 151 and cathode 146. This grid potential would otherwise be reduced without the regenerative action.

The output voltage at cathode 156 of triode 142 therefore varies about some fixed positive potential above ground in accordance with a wave of a triangular waveform having a peak amplitude determined by the product of the duration and the amplitude of the rectangular wave amplitude applied to the control grid 151 of pentode 141. As described above, this peak amplitude is directly proportional to the desired density.

The triangular wave is rendered symmetrical about the zero voltage axis by a coupling capacitor 163 through which it is applied to the junction 164 between two serially connected diodes 165 and 166. When the triangular wave is negative, diode 165 conducts and coupling capacitor 163 becomes charged to a potential determined by the peak negative going potential of the triangular wave. During the positive going half of the triangular wave, the voltage of the charge previously applied to coupling capacitor 163 is added to the peak voltage of the positive going portion of the triangular wave and a storage capacitor 167 connected in multiple with a load resistor 168 becomes charged through diode 166 to a potential determined by the overall peak to peak amplitude of the triangular wave. The potential of storage capacitor 167 is substantially twice the magnitude of the zero to peak voltage of the triangular wave, the operation of diodes 165 and 166 being similar to that of a conventional voltage doubler rectifier. The voltage across storage capacitor 167 is therefore a substantially smooth direct current potential having a magnitude directly proportional to the density of the fluid medium 10.

The potential across storage capacitor 167 is applied to the control grid 169 of a triode 170. The anode 171 of triode 170 is connected directly to the source of anode potential B+. The cathode 172 of triode 170 is connected to the source of negative potential C— through a potentiometer 173. The triode 170 is thus connected as a cathode follower stage in which the potentiometer 173 forms the output resistor.

The density indicator 60 is shown with one of its terminals 175 connected to the movable contact 176 of potentiometer 173. The other terminal 177 is shown grounded. By adjustment of movable contact 176 correction may be made for the small error introduced by residual space current in the cathode follower 170. The error becomes greater with reduced input voltages and ultimately causes a small bias voltage when the input is reduced to zero. The adjustment of movable contact 176 thus permits correction for the departure of the measuring circuit from linearity, particularly when measuring fluids of low densities.

Calibration may be effected by means of a calibration fluid of accurately known low value of density. By means of another calibration fluid having a higher known value of density, slope control resistor 140 may be adjusted to cause the correct density values to be indicated on calibrated scale 61 of indicator 60.

The wave shapes throughout the circuit of Fig. 4 are as follows:

At the output terminal 97 of the oscillator, there is a sinusoidal wave of fixed frequency as indicated by the waveform 177 which is symmetrical about the zero voltage axis.

At the output of velocity amplifier 28 on conductor 113 there is a wave of rectangular wave shape symmetrical about the zero voltage axis as indicated by the waveform 180.

At the output of clamp tube 111, there is a wave of rectangular wave shape as indicated by waveform 181 with positive going portions having an amplitude proportional to the sum of a constant and the acoustic impedance of the fluid medium, the period or duration being inversely proportional to the velocity of propagation of acoustic waves in the fluid of which the density is being measured. The magnitude of the negative going portions is immaterial since these are later suppressed.

At the output of corrector triode 132, there is a wave of rectangular shape as indicated by the waveform 182, the variations about a fixed positive reference potential being proportional to the acoustic impedance of the fluid medium and the duration or time base of each wave being inversely proportional to the velocity of propagation of acoustic waves in the fluid medium.

At the output of cathode follower triode 142 of the integrator, there is a wave of triangular shape as indicated by the waveform 183, the peak variations about a fixed positive reference potential being proportional to the fluid density.

At the junction 154 between diodes 165 and 166 there is a unidirectional triangular wave as indicated by waveform 184, the peak magnitude being proportional to the fluid density.

At the grid 169 of output cathode follower 170, there is a smooth D. C. potential of magnitude proportional to the fluid density as indicated by the horizontal straight line waveform 185.

I have described what I believe to be the best embodiments of my invention. I do not wish, however, to be confined to the embodiments shown, but what I desire to cover by Letters Patent is set forth in the appended claims.

What is claimed is:

1. A densitometer of the class described, comprising: a fluid medium of which the density is to be measured: electroacoustic means for measuring the acoustic impedance of said fluid and producing an electrical quantity proportional to the impedance; second electroacoustic means for measuring the velocity of acoustic propagation in the fluid modifying means connected to said first mentioned means and the second means for removing from said electrical quantity a factor proportional to the propagation velocity of acoustic waves in said fluid medium; and means for deriving a density indication from said modifying means.

2. A densitometer of the class described, comprising: a fluid medium of which the density is to be measured: electroacoustic means for measuring the acoustic impedance of said fluid; modifying means for removing from said measured impedance a factor proportional to the propagation velocity of acoustic waves in said fluid medium; means for deriving a density indication from said modifying means, said modifying means comprising self-oscillatory feed-back means for producing a sustained oscillatory acoustic wave traveling through said fluid medium, the period of said acoustic wave being inversely proportional to said propagation velocity, said modifying means further comprising combining means simultaneously responsive to said acoustic impedance measurement and said period of said acoustic wave and producing an output proportional to the product of the magnitudes of said impedance and said period said output being applied to said density indication deriving means.

3. A densitometer according to claim 2, further comprising a duct in which the fluid medium is confined and through which the fluid medium flows, said electroacoustic means producing acoustic waves which travel in a path defining a predetermined angle with respect to the direction of said fluid flow and wherein said sustained oscillatory acoustic wave travels in a path defining the same predetermined angle with respect to said direction of fluid flow, whereby variations in said acoustic impedance measurement and in said propagation velocity caused by variations in the flow velocity of said fluid are mutually compensatory and are rendered ineffective to produce an error in the measured density.

4. A densitometer of the class described, comprising: electroacoustic transducing means in contact with a fluid of which the density is to be measured; impedance measuring means connected to measure the electrical impedance of said transducing means, said electrical impedance containing a component proportional to the acoustic impedance of said fluid; means including said impedance measuring means for separately measuring said component and producing an electrical quantity proportion thereto; velocity measuring means including additional electroacoustic means in contact with the fluid for measuring the velocity of acoustic propagation in the fluid and means connected to said impedance measuring means and said velocity measuring means for removing from said electrical quantity a factor proportional to the velocity of propagation of acoustic waves in said fluid; and means for measuring the magnitude of said electrical quantity after removal of said factor.

5. A densitometer of the class described, comprising: oscillator means for generating a voltage wave of substantially constant frequency; electroacoustic transducing means; an energizing circuit extending from said oscillator means to said transducing means; a fluid of which the density is to be measured arranged in physical contact with said transducing means; reactance means serially included in said energizing circuit for resonating the reactive component of the electrical impedance of said transducing means; means for deriving a measurement potential from said resonated transducing means; a self-oscillatory feed-back loop comprising transmitting and receiving transducing means for propagating and receiving acoustic waves which travel through said fluid medium, said loop producing an electrical velocity wave of rectangular waveform having a period substantially inversely proportional to said propagation velocity; clamp means for combining said velocity wave and said measurement potential for producing a wave comprising half-waves of rectangular waveform of the same polarity each having a duration determined by the period of said velocity wave and an amplitude determined by the magnitude of said measurement potential; integrating means coupled to said clamp means for deriving from said half-waves a wave of triangular waveform having a peak amplitude proportional to said density of said fluid; and peak amplitude responsive means coupled to said integrating means for deriving from said wave of triangular waveform an indication of the magnitude of said fluid density.

6. A densitometer according to claim 5 in which said peak amplitude responsive means comprises rectifier means and indicating means energized by said rectifier means.

7. A densitometer according to claim 6 in which said rectifier means comprises a capacitor and two diodes connected as a voltage doubler.

8. A densitometer of the class described comprising: oscillator means for generating a voltage wave of substantially constant frequency, said oscillator means comprising means for varying the amplitude of said generated wave; electroacoustic transducing means; an energizing circuit extending from said oscillator means to said transducing means; a fluid of which the density is to be measured acoustically coupled to said transducing means; reactance means serially included in said energizing circuit for resonating the reactive component of the electrical impedance of said transducing means; circuit means for deriving the potential drop across said resonated transducing means; means for applying said potential drop to said oscillator amplitude varying means for varying the amplitude of said oscillator voltage wave in accordance with the magnitude of said potential drop to an extent sufficient to compensate for the effect on said potential drop of energy losses in the circuit of said reactance means; a self-oscillatory feedback loop comprising transmitting and receiving transducing means for propagating and receiving acoustic waves which travel through said fluid medium, the frequency of self-oscillation of said loop being substantially directly proportional to the propagation velocity of said acoustic waves; means for deriving from said loop a velocity wave of rectangular waveform having a period substantially inversely proportional to said propagation velocity; combining means for combining said velocity wave and said unidirectional potential for producing a wave comprising half-waves of rectangular waveform of one polarity each having a duration determined by the period of said velocity wave and an amplitude determined by the magnitude of said unidirectional potential; integrating means coupled to said combining means for deriving from said half-waves a wave having a peak amplitude proportional to said density of said fluid; and peak amplitude responsive means coupled to said integrating means for deriving from said last-named wave an indication of the magnitude of said fluid density.

9. A densitometer of the class described, comprising: means for generating a voltage wave of substantially constant frequency, piezoelectric transducing means energized by said oscillator means; a fluid of which the density is to be measured arranged in physical contact with said transducing means; means for deriving the potential drop across said transducing means; a self-oscillatory feedback loop comprising transmitting and receiving transducing means for propagating and receiving acoustic waves which travel through said fluid medium, the frequency of self-oscillation of said loop being substantially directly proportional to the propagation velocity of said acoustic waves; means for deriving from said loop a velocity wave of rectangular waveform having a period substantially inversely proportional to said propagation velocity; combining means for combining said velocity wave and said unidirectional potential for producing a wave comprising half-waves of rectangular waveform of one polarity each having a duration determined by the period of said velocity wave and an amplitude determined by the magnitude of said unidirectional potential; integrating means coupled to said combining means for deriving from said half-waves a wave of triangular waveform having a peak amplitude proportional to said density of said fluid; and peak amplitude responsive means coupled to said integrating means for deriving from said wave of triangular waveform an indication of the magnitude of said fluid density.

10. Apparatus for measuring the density of a fluid medium which comprises means including an electroacoustic transducer in physical contact with said fluid medium for deriving from said transducer a measurement potential having a magnitude comprising a component directly proportional to the acoustic impedance of said fluid; electroacoustic means acoustically coupled to said fluid medium generating a wave of rectangular waveform having a period inversely proportional to the propagation velocity of acoustic waves in said medium; means for modifying the amplitude of said rectangular wave in accordance with the magnitude of said acoustic impedance component of said measurement potential; means for integrating said modified wave to derive a further wave having a peak amplitude proportional to the density of said fluid; and means for deriving a density indication from the peak amplitude of said further wave.

11. A densitometer of the class described, comprising: oscillator means for generating a voltage wave of substantially constant frequency; electroacoustic transducing means; an energizing circuit extending from said oscillator means to said transducing means; a fluid of which the density is to be measured arranged in physical contact with said transducing means; reactance means serially included in said energizing circuit for resonating the reactive component of the electrical impedance of said transducing means; means for deriving a measurement potential from said transducing means; transmitting and receiving transducing means for propagating and receiving acoustic waves which travel through said fluid medium, having a period substantially inversely proportional to said propagation velocity; clamp means for combining said velocity wave and said measurement potential for producing a wave comprising half-waves of rectangular waveform of the same polarity each having a duration determined by the period of said velocity wave and an amplitude determined by the magnitude of said measurement potential; integrating means coupled to said clamp means for deriving from said half-waves a wave of triangular waveform having a peak amplitude proportional to said density of said fluid; and peak amplitude responsive means coupled to said integrating means for deriving from said wave of triangular waveform an indication of the magnitude of said fluid density.

12. A densitometer of the class described, comprising: oscillator means for generating a voltage wave of substantially constant frequency; electroacoustic transducing means; an energizing circuit extending from said oscillator means to said transducing means; a fluid of which the density is to be measured arranged in physical contact with said transducing means; means for deriving a measurement potential from said transducing means comprising a component directly proportional to the acoustic impedance of said fluid; transmitting and receiving transducing means for propagating and receiving acoustic waves which travel through said fluid medium, the frequency of said waves being substantially directly proportional to the propagation velocity of said acoustic waves; means for deriving from said acoustic waves a velocity wave of rectangular waveform having a period substantially inversely proportional to said propagation velocity; combining means for combining said velocity wave and said measurement potential for producing a wave comprising half-waves of rectangular waveform of one polarity each having a duration determined by the period of said velocity wave and an amplitude determined by the magnitude of said unidirectional potential; integrating means coupled to said combining means for deriving from said half-waves a wave having a peak amplitude proportional to said density of said fluid; and peak amplitude responsive means coupled to said integrating means for deriving from said last-named wave an indication of the magnitude of said fluid density.

13. A densitometer of the class described, comprising: oscillator means for generating a voltage wave of substantially constant frequency, said oscillator means comprising means for varying the amplitude of said generated wave; piezoelectric transducing means; an energizing circuit extending from said oscillator means to said transducing means; a fluid of which the density is to be measured acoustically coupled to said transducing means; inductor means serially included in said energizing circuit for resonating the capacitative component of the electrical impedance of said transducing means; means for deriving the potential drop across said resonated transducing means; means for applying said potential drop to said oscillator; amplitude varying means for varying the amplitude of said oscillator voltage wave in accordance with the magnitude of said potential drop to an extent sufficient to compensate for the effect on said potential drop of energy losses in the circuit of said inductor; a self-oscillatory feedback loop comprising transmitting and receiving transducing means for propagating and receiving acoustic waves which travel through said fluid medium, the frequency of self-oscillation of said loop being substantially directly proportional to the propagation velocity of said acoustic waves; means for deriving from said loop a velocity wave of rectangular waveform having a period substantially inversely proportional to said propagation velocity; means for rectifying said voltage drop for producing a unidirectional potential having a magnitude generally proportional to the acoustic impedance of said fluid; clamp means for combining said velocity wave and said unidirectional potential for producing a wave comprising half-waves of rectangular waveform of one polarity each having a duration determined by the period of said velocity wave and an amplitude determined by the magnitude of said unidirectional potential; integrating means coupled to said clamp means for deriving from said half-waves a wave of triangular waveform having a peak amplitude proportional to said density of said fluid; and peak amplitude responsive means coupled to said integrating means for deriving from said wave of triangular waveform an indication of the magnitude of said fluid density.

14. A densitometer according to claim 13 in which said half-waves produced by said clamp means include a constant error, said densitometer further comprising biased correction means interposed between said clamp means and said integrating means for deducting from the amplitude of each of said half-waves a constant amount in accordance with the magnitude of said constant error.

15. An oscillation generator of the class described comprising: an oscillator tube; a piezo-electric crystal connected to control the frequency of oscillation of said tube; a parallel resonant tank circuit connected to the output of said oscillator tube; diode means shunted across said tank circuit; means for biasing said diode means to cause said diode means to become conductive to limit the peak voltage across said tank circuit whenever said peak voltage exceeds a predetermined maximum value for stabilizing the voltage across said tank circuit; circuit means coupled to said tank circuit for deriving an output from said generator, said biasing means for said diode means comprising a cathode follower stage having an anode, a grid and a cathode, means connecting said anode to a positive terminal of a source of anode potential; a resistor through which said cathode is connected to a negative terminal of said source; means connecting the cathode of said diode means to said resistor, the anode of said diode means being connected to one side of said tank circuit; a capacitor coupling the other side of said tank circuit to said cathode of said diode means; and means for applying a control potential to said grid for varying the amount of bias applied to said diode by said biasing means.

16. In a densitometer of the class described, the combination of oscillator means for generating a voltage wave of substantially constant frequency; electroacoustic transducing means; an energizing circuit extending from said oscillator means to said transducing means; a fluid of which the density is to be measured arranged in physical contact with said transducing means; reactance means serially included in said energizing circuit for resonating the reactive component of the electrical impedance of said transducing means to balance out said reactive component; and means for deriving a measurement potential from said resonated transducing means having a component proportional to the acoustic impedance of the fluid.

17. A densitometer of the class described, comprising oscillator means for generating a voltage wave of substantially constant frequency; electroacoustic transducing means; an energizing circuit extending from said oscillator to said transducing means; a fluid of which the density is to be measured arranged in physical contact with said transducing means; reactance means serially included in said energizing circuit for resonating the reactive component of the electrical impedance of said transducing means; means for deriving a measurement potential from said resonated transducing means; means including electroacoustic transducing means in contact with the fluid for producing an electrical velocity wave having a period substantially inversely proportional to the propagation velocity of acoustic waves in the fluid and means for combining said velocity wave and said measurement potential for producing an electrical quantity substantially proportional to the density of the fluid.

18. A densitometer of the class described, comprising oscillator means for generating a voltage wave of substantially constant frequency; electroacoustic transducing means; an energizing circuit extending from said oscillator means to said transducing means; a fluid of which the density is to be measured arranged in physical contact with said transducing means; reactance means serially included in said energizing circuit for resonating the reactive component of the electrical impedance of said transducing means; means for deriving a measurement potential from said transducing means; transmitting and receiving transducing means for propagating and receiving acoustic waves which travel through said fluid medium and for obtaining from said acoustic wave an electrical wave having a period substantially inversely proportional to the propagation velocity; means for combining said electrical wave and said measurement potential and producing in response thereto an electrical quantity corresponding to the density of the fluid.

References Cited in the file of this patent

UNITED STATES PATENTS

| | | |
|---|---|---|
| 1,881,543 | Hartig et al. | Oct. 11, 1932 |
| 1,915,368 | Lack | June 27, 1933 |
| 1,975,812 | Wallace | Oct. 9, 1934 |
| 2,273,934 | Campbell | Feb. 24, 1942 |
| 2,283,750 | Mikelson | May 19, 1942 |
| 2,483,829 | Hershberger | Oct. 4, 1949 |
| 2,568,277 | Eltgroth | Sept. 18, 1951 |
| 2,669,121 | Garman et al. | Feb. 16, 1954 |
| 2,711,646 | Mendousse | June 28, 1955 |

OTHER REFERENCES

Q. S. T. (page 22) Nov. 1938.